(12) United States Patent
Zhou

(10) Patent No.: US 11,841,527 B2
(45) Date of Patent: Dec. 12, 2023

(54) BACKLIGHT MODULE AND DISPLAY DEVICE

(71) Applicant: WUHAN CHINA STAR OPTOELECTRONICS TECHNOLOGY CO., LTD., Wuhan (CN)

(72) Inventor: Zheng Zhou, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 456 days.

(21) Appl. No.: 17/057,810

(22) PCT Filed: Oct. 30, 2020

(86) PCT No.: PCT/CN2020/125257
§ 371 (c)(1),
(2) Date: Nov. 23, 2020

(87) PCT Pub. No.: WO2022/062066
PCT Pub. Date: Mar. 31, 2022

(65) Prior Publication Data
US 2022/0299700 A1    Sep. 22, 2022

(30) Foreign Application Priority Data
Sep. 23, 2020    (CN) .......................... 202011009470.6

(51) Int. Cl.
*F21V 8/00*    (2006.01)
*G02F 1/13357*    (2006.01)
*G02F 1/1333*    (2006.01)

(52) U.S. Cl.
CPC ........... *G02B 6/0088* (2013.01); *G02B 6/009* (2013.01); *G02B 6/0055* (2013.01); *G02F 1/1336* (2013.01); *G02F 1/133314* (2021.01)

(58) Field of Classification Search
CPC .. G02B 6/0031; G02B 6/0055; G02B 6/0088; G02B 6/009; G02F 1/133314; G02F 1/133605
See application file for complete search history.

(56) References Cited

U.S. PATENT DOCUMENTS

2008/0180600 A1* 7/2008 Oh ..................... G02F 1/133615
349/65
2015/0331170 A1* 11/2015 Cheng .................. G02B 6/0031
362/606
(Continued)

FOREIGN PATENT DOCUMENTS

CN    101182920 A    5/2008
CN    101278151 A    10/2008
(Continued)

OTHER PUBLICATIONS

English Machine Translation of KR 20200063400 A (Year: 2020).*

*Primary Examiner* — Keith G. Delahoussaye
(74) *Attorney, Agent, or Firm* — The Roy Gross Law Firm, LLC; Roy Gross

(57) ABSTRACT

A backlight module and a display device are provided. The backlight module includes: a backplate including a bottom plate and at least one side plate disposed on the bottom plate; a light board including at least one light-emitting diode, wherein the light board is fixed onto one of the at least one side plate and disposed on one side of the bottom plate; and a reflective sheet disposed on the bottom plate and extending between the at least one light-emitting diode and the bottom plate.

16 Claims, 2 Drawing Sheets

(56) References Cited

U.S. PATENT DOCUMENTS

2016/0187573 A1\* 6/2016 Kim ................. G02F 1/133308
    362/606
2017/0059767 A1\* 3/2017 Li ....................... G02B 6/0091

FOREIGN PATENT DOCUMENTS

| CN | 104321582 A | | 1/2015 |
|---|---|---|---|
| CN | 107247364 A | | 10/2017 |
| CN | 107966853 A | | 4/2018 |
| CN | 109192068 A | | 1/2019 |
| CN | 212276187 U | | 1/2021 |
| KR | 20110039092 A | | 4/2011 |
| KR | 20200063400 A | \* | 6/2020 |

\* cited by examiner

BACKLIGHT MODULE AND DISPLAY DEVICE

CROSS REFERENCE TO RELATED APPLICATIONS

This application is a National Phase Entry of PCT/CN2020/125257 filed on Oct. 30, 2020 claiming priority to Chinese application 202011009470.6 filed Sep. 23, 2020. The contents of these applications are incorporated by reference in their entirety.

FIELD OF INVENTION

The present disclosure relates to the field of display technologies, and more particularly, to a backlight module and a display device.

BACKGROUND OF INVENTION

With development of vehicle display technologies, appearance requirements of vehicle display modules are getting higher, and vehicle display screens tend to meet requirements of large screens, narrow bezels, lightweightness, and thinness. Since reliability requirements of the vehicle display modules are higher, backlight modules of the vehicle display modules usually use top emitting light-emitting diodes (LED) as light sources. For the backlight modules which are light and thin, the light-emitting diodes are disposed on a side surface of a light guide plate. In order to fully utilize the light sources and handle optical effect, a center of the light-emitting diodes is on a same central line with a center of the light guide plate. A height of widely used light-emitting diodes is 1.4 mm, while a thickness of the light guide plate is less than 1.6 mm. Therefore, there will be a risk of short circuiting on a lower edge of the light-emitting diodes caused by tin solder or lead wires being in contact with a bottom plate metal after chip mounting.

Therefore, it is necessary to provide a technical solution to solve the problem of short circuit risk on the lower edge of the light-emitting diodes caused by the tin solder or the lead wires being in contact with the bottom plate metal after chip mounting.

Technical problem: an objective of the present disclosure is to provide a backlight module and a display device to solve the problem of short circuit risk on the lower edge of the light-emitting diodes caused by the tin solder or the lead wires being in contact with the bottom plate metal after chip mounting.

SUMMARY OF INVENTION

In order to realize the above objective, the present disclosure provides a backlight module, which includes:
  a backplate including a bottom plate and at least one side plate disposed on the bottom plate;
  a light board including at least one light-emitting diode, wherein the light board is fixed onto one of the at least one side plate and disposed on one side of the bottom plate; and
  a reflective sheet disposed on the bottom plate and extending between the at least one light-emitting diode and the bottom plate.

In the above backlight module, a spacing between one end of the reflective sheet adjacent to the light board and the one of the at least one side plate fixed with the light board is greater than or equal to 0.2 mm and less than or equal to 0.5 mm.

In the above backlight module, the bottom plate is provided with a concave part corresponding to the at least one light-emitting diode.

In the above backlight module, a width of the concave part is greater than or equal to 0.5 mm and less than or equal to 2 mm, and a dented depth of the concave part is greater than or equal to 0.3 mm and less than or equal to 1 mm.

In the above backlight module, the backlight module further includes an insulating layer disposed on the bottom plate and corresponding to the at least one light-emitting diode.

In the above backlight module, the insulating layer is one selected from an insulating glue layer or an ink layer.

In the above backlight module, a spacing between one side of the at least one light-emitting diode adjacent to the reflective sheet and the reflective sheet is greater than 0 mm and less than or equal to 0.1 mm.

In the above backlight module, the backlight module further includes a light guide plate disposed on the reflective sheet, and the at least one light-emitting diode is disposed on one side surface of the light guide plate.

In the above backlight module, the backlight module further includes a thermal conductive glue, and the light board is fixed onto the one of the at least one side plate by the thermal conductive glue.

In the above backlight module, the side of the bottom plate adjacent to the light board is provided with marking lines, the marking lines comprise a first marking line and a second marking line in parallel to each other, the first marking line is adjacent to the one of the at least one side plate fixed with the light board, and one end of the reflective sheet adjacent to the light board is disposed corresponding to the first marking line, the second marking line, or between the first marking line and the second marking line.

The present disclosure further provides a display device, which includes a backlight module and a liquid crystal display panel, wherein, the liquid crystal display panel is disposed on a light-emitting side of the backlight module, and the backlight module includes:
  a backplate including a bottom plate and at least one side plate disposed on the bottom plate;
  a light board including at least one light-emitting diode, wherein the light board is fixed onto one of the at least one side plate and disposed on one side of the bottom plate; and
  a reflective sheet disposed on the bottom plate and extending between the at least one light-emitting diode and the bottom plate.

In the above display device, a spacing between one end of the reflective sheet adjacent to the light board and the one of the at least one side plate fixed with the light board is greater than or equal to 0.2 mm and less than or equal to 0.5 mm.

In the above display device, the bottom plate is provided with a concave part corresponding to the at least one light-emitting diode.

In the above display device, a width of the concave part is greater than or equal to 0.5 mm and less than or equal to 2 mm, and a dented depth of the concave part is greater than or equal to 0.3 mm and less than or equal to 1 mm.

In the above display device, the backlight module further includes an insulating layer disposed on the bottom plate and corresponding to the at least one light-emitting diode.

In the above display device, the insulating layer is one selected from an insulating glue layer or an ink layer.

In the above display device, a spacing between one side of the at least one light-emitting diode adjacent to the reflective sheet and the reflective sheet is greater than 0 mm and less than or equal to 0.1 mm.

In the above display device, the backlight module further includes a light guide plate disposed on the reflective sheet, and the at least one light-emitting diode is disposed on one side surface of the light guide plate.

In the above display device, the backlight module further includes a thermal conductive glue, and the light board is fixed onto the one of the at least one side plate by the thermal conductive glue.

In the above display device, the side of the bottom plate adjacent to the light board is provided with marking lines, the marking lines comprise a first marking line and a second marking line in parallel to each other, the first marking line is adjacent to the one of the at least one side plate fixed with the light board, and one end of the reflective sheet adjacent to the light board is disposed corresponding to the first marking line, the second marking line, or between the first marking line and the second marking line.

Beneficial effect: the present disclosure provides the backlight module and the display device. The backlight module includes: the backplate including the bottom plate and the at least one side plate disposed on the bottom plate; the light board including the at least one light-emitting diode, wherein, the light board is fixed onto the one of the at least one side plate and disposed on one side of the bottom plate; and the reflective sheet disposed on the bottom plate and extending between the at least one light-emitting diode and the bottom plate. By extending the reflective sheet under the at least one light-emitting diode, the present disclosure has an effect of isolating a lower edge of the at least one light-emitting diode from the bottom plate, which prevents the lower edge of the at least one light-emitting diode from having short circuits caused by tin solder or lead wires being in contact with the bottom plate after chip mounting, thereby ensuring the backlight module to operate normally and allowing the display device to have reliability.

DETAILED DESCRIPTION OF PREFERRED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

Figure 1:
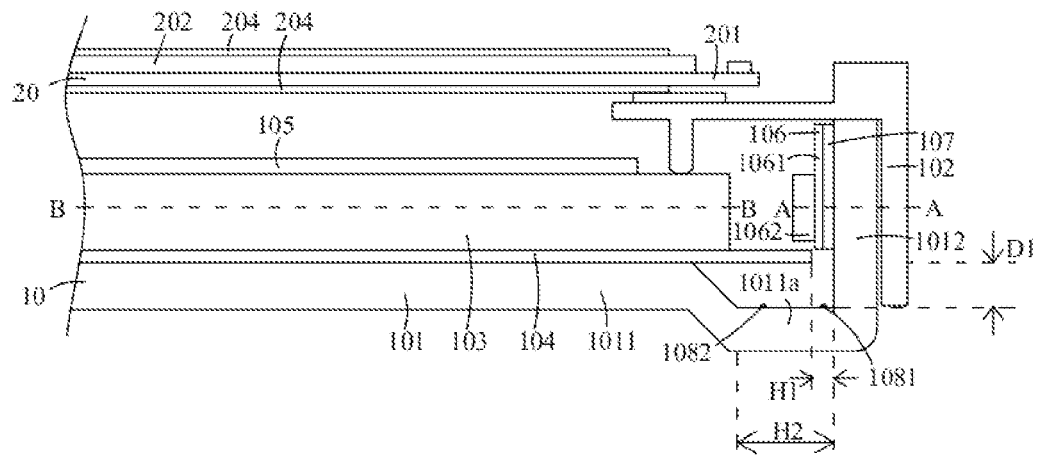
FIG. 1 is a schematic cross-sectional structural diagram of a display device according to embodiment 1 of the present disclosure.

Referring to FIG. 1, FIG. 1 is a schematic cross-sectional structural diagram of a display device according to embodiment 1 of the present disclosure. The display device is a liquid crystal display device. The display device can be applied to vehicles, TVs, tablets, laptops, etc. The display device includes a backlight module 10 and a liquid crystal display panel 20. The liquid crystal display panel 20 is disposed on a light-emitting side of the backlight module 10.

The backlight module 10 is configured to emit backlight. The liquid crystal display panel 20 is configured to receive the backlight emitted from the backlight module 10 and control transmittance of the backlight to display different grayscales. The liquid crystal display panel 20 includes an array substrate 201, a color filter substrate 202, a liquid crystal layer (not shown), and two polarizers 204. The array substrate 201 is disposed opposite to the color filter substrate 202, the liquid crystal layer is disposed between the array substrate 201 and the color filter substrate 202, and the array substrate 201 is positioned on one side adjacent to the backlight module 10. One of the polarizers 204 is disposed on one side of the array substrate 201 away from the color filter substrate 202, and the other one of the polarizers 204 is disposed on one side of the color filter substrate 202 away from the array substrate 201.

The backlight module 10 includes a backplate 101, a plastic frame 102, a light guide plate 103, a reflective sheet 104, an optical film 105, a light board 106, and a thermal conductive glue 107.

The backplate 101 includes a bottom plate 1011 and four side plates 1012 surrounding the bottom plate 1011 and disposed on the bottom plate 1011. A preparation material of the backplate 101 is an aluminum alloy.

The light board 106 is fixed onto one of the side plates 1012 by the thermal conductive glue 107 and disposed on one side of the bottom plate 1011. The thermal conductive glue 107 conducts heat of the light board 106 out through the side plates 1012 of the backplate 101, thereby preventing the light board 106 from having an overly high temperature. The light board 106 includes a circuit substrate 1061 and at least one light-emitting diode 1062 disposed on the circuit substrate 1061.

The reflective sheet 104 is configured to reflect light transmitting through the light guide plate 103 back into the light guide plate 103, thereby improving light utilization. The reflective sheet 104 is disposed on the bottom plate 1011 and extends between the at least one light-emitting diode 1062 and the bottom plate 1011. A base material of the reflective sheet 104 is a polymer, such as polycarbonate.

Since the reflective sheet 104 is insulated and disposed between the at least one light-emitting diode 1062 and the bottom plate 1011, tin solder or lead wires being in contact with the bottom plate 1011 after chip mounting occurring on a bottom edge of the at least one light-emitting diode 1062 can be prevented, thereby preventing the at least one light-emitting diode 1062 from having a risk of short circuits. In addition, the reflective sheet 104 extending under the at least one light-emitting diode 1062 can also improve utilization of light emitted from the at least one light-emitting diode 1062.

Since a preparation material of the reflective sheet 104 is a polymer material, and a large amount of heat will be generated by the at least one light-emitting diode 1062 during operation, a temperature surrounding the at least one light-emitting diode 1062 is higher, and the reflective sheet 104 is prone to expand under a high temperature condition. When the temperature is lower, the reflective sheet 104 will shrink. In order to reserve an expansion space for one end of the reflective sheet 104 adjacent to the light board 106, and prevent the reflective sheet 104 from undergoing a force and having wrinkles, caused by the reflective sheet 104 being in contact with the side plates 1012, a spacing H1 between the end of the reflective sheet 104 adjacent to the light board 106 and the side plate 1012 fixed with the light board 106 is greater than or equal to 0.2 mm. In addition, in order to prevent the reflective sheet 104 from being not positioned between the at least one light-emitting diode 1062 and the bottom plate 1011 caused by shrinkage of the reflective sheet 104, the spacing H1 between the end of the reflective sheet 104 adjacent to the light board 106 and the side plate 1012 fixed with the light board 106 is less than or equal to 0.5 mm. Specifically, the spacing H1 between the end of the reflective sheet 104 adjacent to the light board 106 and the side plate 1012 fixed with the light board 106 is 0.5 mm.

In order to improve assembly accuracy of the reflective sheet 104, and prevent a distance between the reflective sheet 104 and the side plate 1012 from exceeding a predetermined distance caused by lower assembly accuracy of the reflective sheet 104, the side of the bottom plate 1011 adjacent to the light board 106 is provided with marking lines, the marking lines include a first marking line 1081 and a second marking line 1082 in parallel to each other, the first marking line 1081 is adjacent to the side plate 1012 fixed with the light board 106, and the end of the reflective sheet 104 adjacent to the light board 106 is disposed corresponding to the first marking line 1081, the second marking line 1082, or between the first marking line 1081 and the second marking line 1082.

The light guide plate 103 is disposed on the reflective sheet 104, and the at least one light-emitting diode 1062 is disposed on one side surface of the light guide plate 103. A central line B-B of the light guide plate 103, which is parallel to a light-emitting surface of the backlight module 10, coincides with a central line A-A of the at least one light-emitting diode 1062, which is perpendicular to a light-emitting surface of the at least one light-emitting diode 1062. Therefore, light emitted from the at least one light-emitting diode 1062 can be fully used, and incident light can be effectively handled by the light guide plate 103.

Figure 3:
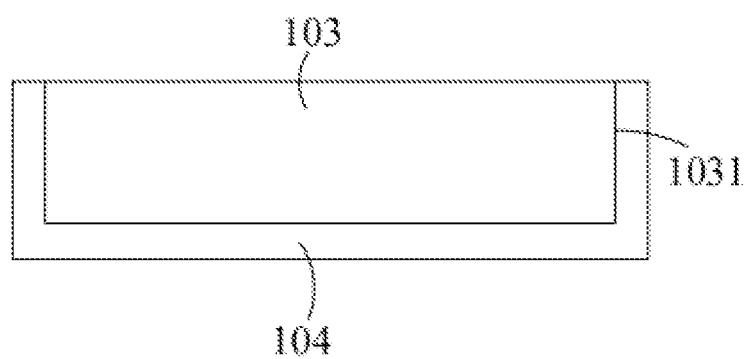
FIG. 3 is a schematic diagram of a part of a reflective sheet being folded to side surfaces of a light guide plate according to an embodiment of the present disclosure.

The light guide plate 103 has four side surfaces, wherein, one of the side surfaces acts as a light incident surface for light emitted from the at least one light-emitting diode 1062. As shown in FIG. 3, FIG. 3 is a schematic diagram of a part of the reflective sheet being folded to the side surfaces of the light guide plate. The part of the reflective sheet 104 is folded to three remaining side surfaces 1031 of the light guide plate 103 to fix the reflective sheet 104, thereby preventing the reflective sheet 104 from moving, while light emitted from the three side surfaces 1031 of the light guide plate 103 can be reflected back to the light guide plate 103, thereby improving light utilization.

The bottom plate 1011 is provided with a concave part 1011a corresponding to the at least one light-emitting diode 1062, so a distance between the bottom edge of the at least one light-emitting diode 1062 and the concave part 1011a can be ensured, and the at least one light-emitting diode 1062 can be prevented from short circuiting caused by the bottom edge of the at least one light-emitting diode 1062 being in contact with the bottom plate 1011 when the reflective sheet 104 shrinks and is not positioned between the at least one light-emitting diode 1062 and the bottom plate 1011.

A width H2 of the concave part 1011a is greater than or equal to 0.5 mm and less than or equal to 2 mm to ensure that the width H2 of the concave part 1011a adapts to a thickness of the at least one light-emitting diode 1062, prevent short circuits caused by the at least one light-emitting diode 1062 being in contact with the bottom plate 1011 outside the concave part 1011a due to the width H2 being small, and prevent a larger thickness of the backlight module 10 corresponding to a display area due to an overly large width of the concave part 1011a, which is not beneficial for the backlight module 10 to realize thinness. A dented depth D1 of the concave part 1011a is greater than or equal to 0.3 mm and less than or equal to 1 mm to ensure a distance between a lower edge of the at least one light-emitting diode 1062 and the concave part 1011a, thereby preventing the lower edge of the at least one light-emitting diode 1062 from being in contact with the concave part 1011a. A longitudinal section of the concave part 1011a is inverted trapezoidal.

Specifically, the width H2 of the concave part 1011a may be 0.6 mm, 0.8 mm, 1.2 mm, 1.5 mm, or 1.8 mm. The dented depth D1 of the concave part 1011a may be 0.5 mm, 0.6 mm, or 0.8 mm.

The plastic frame 102 is disposed on the side plates 1012 of the backplate 101, the plastic frame 102 includes a support part, and the liquid crystal display panel 20 is fixed onto the support part of the plastic frame 102 by foam glue. A fixed part is extended from the support part of the plastic frame 102. The light guide plate 103 is fixed by the fixed part, and there is an interference fit between the fixed part and the light guide plate 103.

The optical film 105 is used to further deal with light emitted from the light guide plate 103 to improve brightness and uniformity of light distribution. The optical film 105 is disposed on a surface of the light guide plate 103 away from the reflective sheet 104. The optical film 105 includes, but is not limited to, a diffusion plate and a brightness enhancing film.

By extending the reflective sheet of the backlight module under the at least one light-emitting diode, the display device of the embodiment has an effect of isolating the lower edge of the at least one light-emitting diode from the bottom plate, which prevents the lower edge of the at least one light-emitting diode from having short circuits caused by the tin solder or the lead wires being in contact with the bottom plate after chip mounting, thereby ensuring the backlight module to operate normally and allowing the display device to have reliability. The reflective sheet extending under the at least one light-emitting diode improves the utilization of light emitted from the at least one light-emitting diode.

Figure 2:
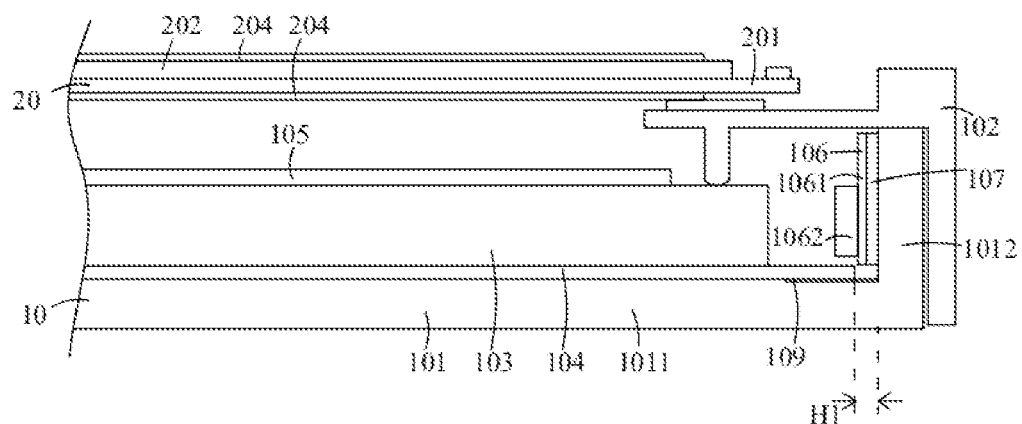
FIG. 2 is a schematic cross-sectional structural diagram of the display device according to embodiment 2 of the present disclosure.

Referring to FIG. 2, FIG. 2 is a schematic cross-sectional structural diagram of the display device according to embodiment 2 of the present disclosure. The display device in this embodiment is basically similar to the display device in embodiment 1, and differences are that in this embodiment, the backlight module 20 further includes an insulating layer 109 disposed on the bottom plate 1011 and corresponding to the at least one light-emitting diode 1062, and a position of the bottom plate 1011 corresponding to the at least one light-emitting diode 1062 is not provided with the concave part 1011a, that is, the bottom plate 1011 is flat.

Compared to the display device of embodiment 1, this embodiment disposes the insulating layer 109 on the bottom plate 1011 of the backlight module 10, which is more beneficial for thinness of the backlight module 10.

The insulating layer 109 is one selected from an insulating glue layer or an ink layer. Wherein, the ink layer may be a white ink layer. The insulating layer 109 can prevent the lower edge of the at least one light-emitting diode 1062 from being in contact with the bottom plate 1011. A thickness of the insulating layer 109 ranges from 0.03 mm to 0.05 mm. For example, the thickness of the insulating layer is 0.04 mm. A heat deformation temperature of the insulating layer 109 is greater than or equal to 120 degrees, so the insulating layer 109 can be prevented from losing effectiveness due to a high temperature when the light board is in operation.

A spacing between one side of the at least one light-emitting diode 1062 adjacent to the reflective sheet 104 and the reflective sheet 104 is greater than 0 mm and less than or equal to 0.1 mm, so after subjected to heat and then expanding, the reflective sheet 104 will not have wrinkles due to a force of the at least one light-emitting diode 1062. The spacing between the side of the at least one light-emitting diode 1062 adjacent to the reflective sheet 104 and the reflective sheet 104 may be 0.05 mm, 0.02 mm, or 0.08 mm.

It should be noted that disposing the light guide plate 103 on the reflective sheet 104 can have a part of the reflective sheet 104 corresponding to the light guide plate 103 to be subjected to gravity effect of the light guide plate 103 when in thermal expansion and prevented from having wrinkles, thereby preventing the reflective sheet 104 from having wrinkles and preventing reflected light from having different effects.

The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:

1. A backlight module, comprising:
    a backplate comprising a bottom plate and at least one side plate disposed on the bottom plate;
    a light board comprising at least one light-emitting diode, wherein the light board is fixed onto one of the at least one side plate and disposed on one side of the bottom plate; and
    a reflective sheet disposed on the bottom plate and extending between the at least one light-emitting diode and the bottom plate;
    wherein the bottom plate is provided with a concave part formed adjacent to one of the at least one side plate and corresponding to the at least one light-emitting diode;
    wherein the side of the bottom plate adjacent to the light board is provided with marking lines, the marking lines are formed on a surface of the concave part and comprise a first marking line and a second marking line in parallel to each other at an interval in a direction from the one of the at least one side plate to the reflective sheet, the first marking line is adjacent to the one of the at least one side plate fixed with the light board, and one end of the reflective sheet adjacent to the light board is disposed corresponding to the first marking line, the second marking line, or between the first marking line and the second marking line.

2. The backlight module according to claim 1, wherein a spacing between one end of the reflective sheet adjacent to the light board and the one of the at least one side plate fixed with the light board is greater than or equal to 0.2 mm and less than or equal to 0.5 mm.

3. The backlight module according to claim 1, wherein a width of the concave part is greater than or equal to 0.5 mm and less than or equal to 2 mm, and a dented depth of the concave part is greater than or equal to 0.3 mm and less than or equal to 1 mm.

4. The backlight module according to claim 1, further comprising an insulating layer disposed on the bottom plate and corresponding to the at least one light-emitting diode.

5. The backlight module according to claim 4, wherein the insulating layer is one selected from an insulating glue layer or an ink layer.

6. The backlight module according to claim 1, wherein a spacing between one side of the at least one light-emitting diode adjacent to the reflective sheet and the reflective sheet is greater than 0 mm and less than or equal to 0.1 mm.

7. The backlight module according to claim 1, further comprising a light guide plate disposed on the reflective sheet, wherein the at least one light-emitting diode is disposed on one side surface of the light guide plate.

8. The backlight module according to claim 1, further comprising a thermal conductive glue, wherein the light board is fixed onto the one of the at least one side plate by the thermal conductive glue.

9. A display device, comprising a backlight module and a liquid crystal display panel, wherein the liquid crystal display panel is disposed on a light-emitting side of the backlight module, and the backlight module comprises:
    a backplate comprising a bottom plate and at least one side plate disposed on the bottom plate;
    a light board comprising at least one light-emitting diode, wherein the light board is fixed onto one of the at least one side plate and disposed on one side of the bottom plate; and
    a reflective sheet disposed on the bottom plate and extending between the at least one light-emitting diode and the bottom plate;
    wherein the bottom plate is provided with a concave part formed adjacent to one of the at least one side plate and corresponding to the at least one light-emitting diode;
    wherein the side of the bottom plate adjacent to the light board is provided with marking lines, the marking lines are formed on a surface of the concave part and comprise a first marking line and a second marking line in parallel to each other at an interval in a direction from the one of the at least one side plate to the reflective sheet, the first marking line is adjacent to the one of the at least one side plate fixed with the light board, and one end of the reflective sheet adjacent to the light board is disposed corresponding to the first marking line, the second marking line, or between the first marking line and the second marking line.

10. The display device according to claim 9, wherein a spacing between one end of the reflective sheet adjacent to the light board and the one of the at least one side plate fixed with the light board is greater than or equal to 0.2 mm and less than or equal to 0.5 mm.

11. The display device according to claim 9, wherein a width of the concave part is greater than or equal to 0.5 mm and less than or equal to 2 mm, and a dented depth of the concave part is greater than or equal to 0.3 mm and less than or equal to 1 mm.

12. The display device according to claim 9, wherein the backlight module further comprises an insulating layer disposed on the bottom plate and corresponding to the at least one light-emitting diode.

13. The display device according to claim 12, wherein the insulating layer is one selected from an insulating glue layer or an ink layer.

14. The display device according to claim 9, wherein a spacing between one side of the at least one light-emitting diode adjacent to the reflective sheet and the reflective sheet is greater than 0 mm and less than or equal to 0.1 mm.

15. The display device according to claim 9, wherein the backlight module further comprises a light guide plate disposed on the reflective sheet, and the at least one light-emitting diode is disposed on one side surface of the light guide plate.

16. The display device according to claim 9, wherein the backlight module further comprises a thermal conductive glue, and the light board is fixed onto the one of the at least one side plate by the thermal conductive glue.

\* \* \* \* \*